(12) United States Patent
Nakajima et al.

(10) Patent No.: US 12,091,734 B2
(45) Date of Patent: Sep. 17, 2024

(54) STEEL WIRE AND SPRING

(71) Applicant: Sumitomo Electric Industries, Ltd., Osaka (JP)

(72) Inventors: Tetsuya Nakajima, Osaka (JP); Fuminori Okada, Osaka (JP); Kazuaki Sugimura, Osaka (JP); Hiromu Izumida, Osaka (JP); Katsutoshi Iwamoto, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 991 days.

(21) Appl. No.: 17/048,051

(22) PCT Filed: Apr. 7, 2020

(86) PCT No.: PCT/JP2020/015685
§ 371 (c)(1),
(2) Date: Oct. 15, 2020

(87) PCT Pub. No.: WO2021/002074
PCT Pub. Date: Jan. 7, 2021

(65) Prior Publication Data
US 2022/0307115 A1     Sep. 29, 2022

(30) Foreign Application Priority Data
Jul. 1, 2019   (JP) .................. 2019-122842

(51) Int. Cl.
*C22C 38/24* (2006.01)
*C21D 1/06* (2006.01)
(Continued)

(52) U.S. Cl.
CPC ............ *C22C 38/24* (2013.01); *C21D 1/06* (2013.01); *C21D 9/02* (2013.01); *C21D 9/525* (2013.01);
(Continued)

(58) Field of Classification Search
CPC .... F16F 1/042; F16F 1/021; F16F 1/06; F16F 2224/0208; F16F 2228/007;
(Continued)

(56) References Cited

U.S. PATENT DOCUMENTS 3,929,523 A * 12/1975 Kinoshi ............... C22C 38/22
148/529
5,824,922 A * 10/1998 Aonuma ............. C22C 33/0207
419/10
(Continued)

FOREIGN PATENT DOCUMENTS

JP   2000-169937 A   6/2000
JP   2003-003241 A   1/2003
(Continued)

OTHER PUBLICATIONS

"Comparison of the ASTM Comparative Chart Method and the Mean Line Intercept Method in Determining the Effect of Solidification Rate on the Yield Strength of AA5182". Brad Peirson. School of Engineering Grand Valley State University. (Year: 2005).*

*Primary Examiner* — Bradley T King
*Assistant Examiner* — James K Hsiao
(74) *Attorney, Agent, or Firm* — McCarter & English, LLP; Michael A. Sartori

(57) ABSTRACT

A steel wire is formed of a steel containing: not less than 0.6 mass % and not more than 0.7 mass % carbon, not less than 1.2 mass % and not more than 2.1 mass % silicon, not less than 0.2 mass % and not more than 0.6 mass % manganese, not less than 1.4 mass % and not more than 2 mass % chromium, and not less than 0.15 mass % and not more than 0.3 mass % vanadium, with the balance being iron and unavoidable impurities. The steel includes a matrix made up of tempered martensite, and a non-metallic inclusion present in the matrix. When $\sqrt{\text{area}}$ of the non-metallic inclusion is represented as $H_1$ and $\sqrt{\text{area}}$ of a region including both the (Continued)

non-metallic inclusion and a decreased-hardness portion is represented as $H_2$, a ratio of $H_2$ to $H_1$, or, $H_2/H_1$ is at least 1 and less than 1.3.

7 Claims, 6 Drawing Sheets

(51) Int. Cl.
| | |
|---|---|
| *C21D 9/02* | (2006.01) |
| *C21D 9/52* | (2006.01) |
| *C22C 38/02* | (2006.01) |
| *C22C 38/04* | (2006.01) |
| *C23C 8/26* | (2006.01) |
| *F16F 1/02* | (2006.01) |
| *F16F 1/06* | (2006.01) |

(52) U.S. Cl.
CPC .............. *C22C 38/02* (2013.01); *C22C 38/04* (2013.01); *C23C 8/26* (2013.01); *F16F 1/021* (2013.01); *C21D 2211/001* (2013.01); *C21D 2211/008* (2013.01); *F16F 1/06* (2013.01); *F16F 2224/0208* (2013.01); *F16F 2228/007* (2013.01); *F16F 2238/026* (2013.01)

(58) Field of Classification Search
CPC ... F16F 2238/026; F16F 2226/02; B21F 3/02; C22C 38/02; C22C 38/04; C22C 38/18; C22C 33/0264; C22C 33/0271; C22C 38/24; C21D 9/02; C21D 2211/001; C21D 2211/008; C23C 8/26
See application file for complete search history.

(56) References Cited

U.S. PATENT DOCUMENTS

| | | | |
|---|---|---|---|
| 5,952,590 A * | 9/1999 | Kawata | C22C 38/44 419/10 |
| 6,302,937 B1 * | 10/2001 | Hayashi | C22C 33/0207 75/231 |
| 6,338,763 B1 | 1/2002 | Hashimura et al. | |
| 9,611,523 B2 | 4/2017 | Yoshihara | |
| 2006/0156864 A1 | 7/2006 | Sakamoto et al. | |
| 2008/0202289 A1 | 8/2008 | Sakamoto et al. | |
| 2008/0271824 A1 | 11/2008 | Fujino et al. | |
| 2009/0092516 A1* | 4/2009 | Hashimura | C21D 1/18 148/333 |
| 2009/0205753 A1* | 8/2009 | Hashimura | C22C 38/50 148/320 |
| 2010/0028196 A1* | 2/2010 | Hashimura | C22C 38/24 420/104 |
| 2012/0125489 A1 | 5/2012 | Hashimura et al. | |
| 2012/0291927 A1* | 11/2012 | Hashimura | C22C 38/38 420/104 |
| 2015/0203947 A1* | 7/2015 | Hasegawa | C21D 8/0236 148/533 |
| 2017/0283900 A1* | 10/2017 | Hasegawa | C23C 2/40 |
| 2017/0362689 A1* | 12/2017 | Cha | C22C 38/001 |
| 2018/0073093 A1* | 3/2018 | Oura | C22C 38/54 |
| 2018/0259022 A1* | 9/2018 | Teramoto | C21D 6/002 |
| 2019/0233912 A1 | 8/2019 | Okada et al. | |
| 2019/0309385 A1* | 10/2019 | Yi | C22C 38/32 |
| 2020/0095663 A1 | 3/2020 | Suzuki et al. | |

FOREIGN PATENT DOCUMENTS

| | | | |
|---|---|---|---|
| JP | 2005-029887 A | | 2/2005 |
| JP | 2005-105363 A | | 4/2005 |
| JP | 2005-120479 A | | 5/2005 |
| JP | 2010196103 A | * | 9/2010 |
| JP | 2010-222604 A | | 10/2010 |
| JP | 2012052218 A | * | 3/2012 |
| JP | 2014-043612 A | | 3/2014 |
| JP | 2018-062690 A | | 4/2018 |
| KR | 10-2008-0111688 A | | 12/2008 |
| WO | 2008/156295 A2 | | 12/2008 |
| WO | 2011/004913 A1 | | 1/2011 |
| WO | 2018/012158 A1 | | 1/2018 |
| WO | 2018/230717 A1 | | 12/2018 |

* cited by examiner

STEEL WIRE AND SPRING

TECHNICAL FIELD

The present disclosure relates to a steel wire and a spring.

The present application claims priority based on Japanese Patent Application No. 2019-122842 filed on Jul. 1, 2019, the entire contents of which are incorporated herein by reference.

BACKGROUND ART

In a spring obtained by coiling a steel wire into a spring shape, improved fatigue strength is desired. Steel wires that can improve the fatigue strength of springs have been proposed (see, for example, Patent Literatures 1 and 2).

CITATION LIST

Patent Literature

Patent Literature 1: Japanese Patent Application Laid-Open No. 2000-169937
Patent Literature 2: Japanese Patent Application Laid-Open No. 2005-105363

SUMMARY OF INVENTION

A steel wire according to the present disclosure is formed of a steel containing: not less than 0.6 mass % and not more than 0.7 mass % carbon, not less than 1.2 mass % and not more than 2.1 mass % silicon, not less than 0.2 mass % and not more than 0.6 mass % manganese, not less than 1.4 mass % and not more than 2 mass % chromium, and not less than 0.15 mass % and not more than 0.3 mass % vanadium, with the balance being iron and unavoidable impurities. The steel wire has a wire diameter of not less than 1 mm and not more than 6 mm, and a tensile strength of 2000 MPa or more. The steel includes a matrix made up of tempered martensite, and a non-metallic inclusion present in the matrix. When $\sqrt{\text{area}}$ of the non-metallic inclusion is represented as $H_1$ and $\sqrt{\text{area}}$ of a region including both the non-metallic inclusion and a decreased-hardness portion, which is a region formed around the non-metallic inclusion in the matrix and having a hardness by a nano-indentation method of 70% or less as compared with the other region of the matrix, is represented as $H_2$, a ratio of $H_2$ to $H_1$, or, $H_2/H_1$ is at least 1 and less than 1.3.

DESCRIPTION OF EMBODIMENTS

Figure 1:
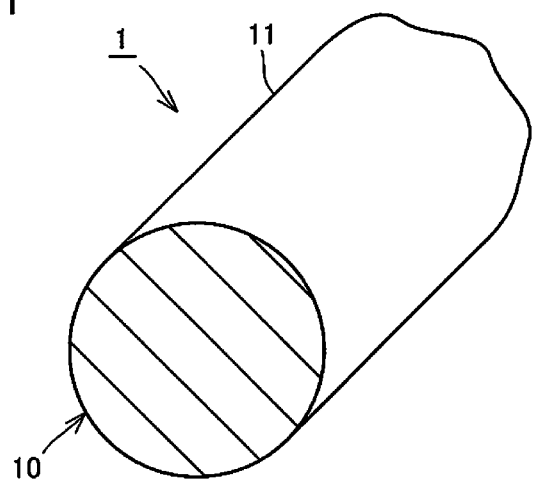
FIG. 1 is a perspective view showing the structure of a steel wire.

Problem to be Solved by the Present Disclosure

For example, fatigue strength of a spring can be improved by using nickel as one of alloy components of a steel constituting the steel wire. The use of nickel, however, increases the production cost. Patent Literature 1 states that the fatigue strength of a spring can be improved by adjusting the size of non-metallic inclusions. However, it is substantially difficult to eliminate the non-metallic inclusions having the particle size of 15 μm or less. Patent Literature 2 states that the fatigue strength of a spring can be improved by performing certain ausforming. However, performing the ausforming as described above increases the production cost.

In view of the foregoing, one object is to provide a steel wire and a spring that can achieve improved fatigue strength of the spring while suppressing the increase in cost.

Advantageous Effects of the Present Disclosure

The steel wire and the spring according to the present disclosure can achieve improved fatigue strength of the spring while suppressing the increase in cost.

Description of Embodiments of the Present Disclosure

Firstly, embodiments of the present disclosure will be listed and described. A steel wire according to the present disclosure is formed of a steel containing: not less than 0.6 mass % and not more than 0.7 mass % carbon, not less than 1.2 mass % and not more than 2.1 mass % silicon, not less than 0.2 mass % and not more than 0.6 mass % manganese, not less than 1.4 mass % and not more than 2 mass % chromium, and not less than 0.15 mass % and not more than 0.3 mass % vanadium, with the balance being iron and unavoidable impurities. The steel wire has a wire diameter of not less than 1 mm and not more than 6 mm, and a tensile strength of 2000 MPa or more. The steel includes a matrix made up of tempered martensite, and a non-metallic inclusion present in the matrix. When $\sqrt{\text{area}}$ of the non-metallic inclusion is represented as $H_1$ and $\sqrt{\text{area}}$ of a region including both the non-metallic inclusion and a decreased-hardness portion, which is a region formed around the non-metallic inclusion in the matrix and having a hardness by a nano-indentation method of 70% or less as compared with the other region of the matrix, is represented as $H_2$, a ratio of $H_2$ to $H_1$, or, $H_2/H_1$ is at least 1 and less than 1.3.

It should be noted that $\sqrt{\text{area}}$ refers to a square root of the product of a major diameter a and a minor diameter b of an ellipse having a smallest area among the ellipses circumscribing the non-metallic inclusion appearing in the cross section of the steel wire perpendicular to the longitudinal direction. Although it is technically expressed as in the following expression (1), in the present disclosure, it is represented as $\sqrt{\text{area}}$ for convenience.

$$\sqrt{\text{area}} = (a \times b)^{1/2} \qquad \text{[Math. 1]}$$

The present inventors investigated measures to improve the fatigue strength of a spring. Improving the strength of the steel wire can also improve the fatigue strength of the spring. However, even if the steel wire is improved in strength, the fatigue strength of the spring cannot be improved sufficiently when the frequency of spring fracture originating from non-metallic inclusions contained in the steel (i.e. susceptibility to inclusions) increases.

The steel wire of the present disclosure is formed of a steel having a tempered martensite structure of the above-described component composition. The steel wire of the present disclosure thus has high strength. Further, in the steel wire of the present disclosure, costly nickel is not adopted as an additive element. This suppresses the increase in cost. In the steel, in the vicinity of the non-metallic inclusion, a decreased-hardness portion may be formed which is a region where hardness is decreased as compared with the matrix of the steel. According to the investigations by the present inventors, such a region increases the susceptibility to inclusions. As to $H_1$, which is $\sqrt{area}$ of the non-metallic inclusion, and $H_2$, which is $\sqrt{area}$ of a region including both the decreased-hardness portion and the non-metallic inclusion, the ratio of $H_2$ to $H_1$, or, $H_2/H_1$ is an indicator of the susceptibility to inclusions. According to the investigations of the present inventors, restricting $H_2/H_1$ to less than 1.3 can sufficiently suppress the susceptibility to inclusions. As such, the steel wire according to the present disclosure has its strength improved, with the cost increase being suppressed, and its susceptibility to inclusions suppressed, and it thus achieves improved fatigue strength of the spring.

Here, the reasons for limiting the component composition of the steel constituting the steel wire to the above-described ranges will be described.

Carbon: not less than 0.6 mass % and not more than 0.7 mass %

Carbon is an element that greatly affects the strength of the steel wire having a tempered martensite structure. For imparting sufficient strength to the steel wire for a spring, the carbon content is required to be not less than 0.6 mass %. On the other hand, an increased carbon content leads to reduced toughness and degraded workability when coiling the wire into a spring shape or when drawing the wire. For ensuring sufficient workability, the carbon content is required to be not more than 0.7 mass %. For further improving the strength, the carbon content is preferably not less than 0.62 mass %. For improving the toughness and facilitating the working, the carbon content is preferably not more than 0.68 mass %.

Silicon: not less than 1.2 mass % and not more than 2.1 mass %

Silicon is an element necessary as a deoxidizing agent at the time of steelmaking. Silicon has resistance to softening, which is the property to suppress softening by heating. For suppressing softening in heat treatment such as nitriding treatment performed after the steel wire is coiled into a spring shape, the silicon content is required to be not less than 1.2 mass %. For further improving the resistance to softening against heating, the silicon content is preferably not less than 1.5 mass %. On the other hand, if silicon is added in an excessive amount, inclusions would likely be generated, and part of silicon that cannot be dissolved in a solid state would cause embrittlement. For these reasons, the silicon content is required to be not more than 2.1 mass %, and preferably not more than 2.0 mass %.

Manganese: not less than 0.2 mass % and not more than 0.6 mass %

Manganese is a useful element for fixing sulfur in the steel as manganese sulfide. It also enhances hardenability during quenching of the steel wire, thereby contributing to improved strength of the steel wire. To ensure that manganese exerts such functions sufficiently, the manganese content is required to be not less than 0.2 mass %. On the other hand, if manganese is added in an excessive amount, in the case where patenting is performed prior to the wire drawing step, a martensite structure may be generated during cooling after heating. The martensite structure thus generated would degrade the workability at the time of wire drawing. Thus, the manganese content is required to be not more than 0.6 mass %. To ensure that manganese exerts the above functions more reliably, the manganese content is preferably not less than 0.3 mass %. For further reliably suppressing the generation of the martensite structure, the manganese content is preferably not more than 0.5 mass %.

Chromium: not less than 1.4 mass % and not more than 2.0 mass %

Chromium is an element that enhances hardenability during quenching of the steel wire, contributing to improved strength of the steel wire. Further, chromium suppresses softening by heat treatment such as nitriding treatment performed after the steel wire is coiled into a spring shape. To ensure that chromium has such effects, the chromium content is required to be not less than 1.4 mass % and preferably not less than 1.6 mass %. On the other hand, if chromium is added in an excessive amount, in the case where patenting is performed prior to the wire drawing step, a martensite structure may be generated during cooling after heating. The martensite structure thus generated would degrade the workability at the time of wire drawing. Thus, the chromium content is required to be not more than 2.0 mass %. For more reliably suppressing the generation of the martensite structure, the chromium content is preferably not more than 1.8 mass %.

Vanadium: not less than 0.15 mass % and not more than 0.3 mass %

Vanadium generates fine carbides in the steel and, thus, suppresses coarsening of prior austenite grains in the steel wire while suppressing softening in the heat treatment such as nitriding treatment performed after the steel wire is coiled into a spring shape. To ensure that vanadium reliably exerts such functions, the vanadium content is required to be not less than 0.15 mass % and preferably not less than 0.18 mass %. On the other hand, if vanadium is added in an excessive amount, the carbides will become coarse. Such coarse carbides will cause fracture of the spring. For these reasons, the vanadium content is required to be not more than 0.3 mass % and preferably not more than 0.22 mass %.

Unavoidable Impurities

During the process of producing a steel wire, phosphorus, sulfur, copper, etc. are inevitably mixed into the steel constituting the steel wire. Phosphorus and sulfur contained in an excessive amount will cause grain boundary segregation and produce inclusions, thereby degrading the properties of the steel wire. Therefore, the phosphorus content and sulfur content are each preferably not more than 0.035 mass % and more preferably not more than 0.025 mass %. Further, copper degrades hot workability of the steel. Therefore, the copper content is preferably not more than 0.2 mass %. The total content of the unavoidable impurities is preferably not more than 1 mass %.

In the steel wire described above, the prior austenite grains in the steel may have the grain size number of 11 or more. Such a small grain size of the prior austenite grains in the steel can improve the toughness of the steel wire.

A spring according to the present disclosure includes the steel wire described above. In the spring, fatigue strength can be improved by decreasing the susceptibility to inclusions in a region of the steel wire constituting the spring where the distance from the outer peripheral surface of the steel wire is, for example, not smaller than 100 μm and not greater than 300 μm. In the steel wire according to the present disclosure, the susceptibility to inclusions is suppressed over the entire region including the above-described region. As a result, the spring of the present disclosure, which includes the steel wire of the present disclosure, provides a spring that can achieve improved fatigue strength while suppressing the increase in cost.

In the spring described above, the steel wire may include a nitride layer that constitutes the outer peripheral surface of the steel wire. The nitride layer thus included can improve the fatigue strength of the spring.

DETAILS OF EMBODIMENTS OF THE PRESENT DISCLOSURE

Embodiments of the steel wire and the spring according to the present disclosure will be described below with reference to the drawings. In the following drawings, the same or corresponding parts are denoted by the same reference numerals, and the description thereof will not be repeated.

FIG. 1 is a perspective view showing the structure of a steel wire. FIG. 1 also illustrates a cross section of the steel wire perpendicular to the longitudinal direction thereof. Firstly, referring to FIG. 1, a steel wire 1 according to the present embodiment is a steel wire that has a cross section 10 of a circular shape perpendicular to the longitudinal direction and an outer peripheral surface 11 of a cylindrical surface shape. The steel wire 1 has a diameter of not less than 1 mm and not more than 6 mm.

The steel wire 1 is formed of a steel containing: not less than 0.6 mass % and not more than 0.7 mass % carbon, not less than 1.2 mass % and not more than 2.1 mass % silicon, not less than 0.2 mass % and not more than 0.6 mass % manganese, not less than 1.4 mass % and not more than 2 mass % chromium, and not less than 0.15 mass % and not more than 0.3 mass % vanadium, with the balance being iron and unavoidable impurities.

Figure 2:
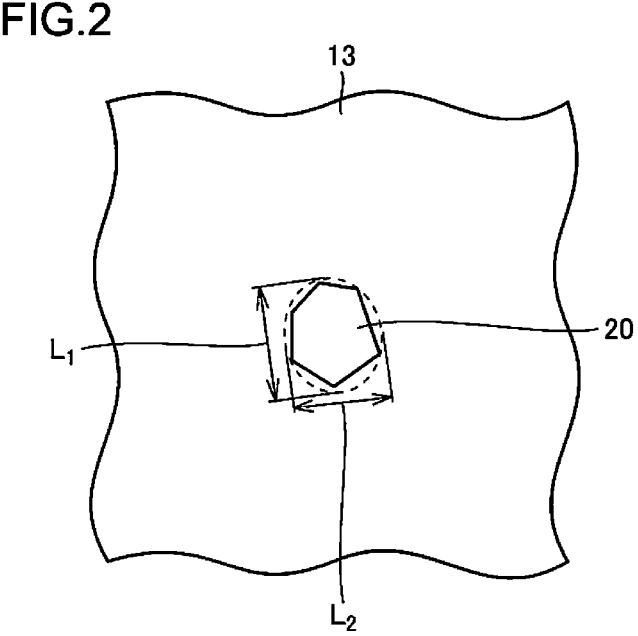
FIG. 2 is a schematic cross-sectional view showing the structure in a cross section of a steel constituting the steel wire.

FIG. 2 is a schematic cross-sectional view showing a cross section of the steel wire 1 perpendicular to the longitudinal direction. Referring to FIGS. 1 and 2, the steel constituting the steel wire 1 includes a matrix 13, made up of tempered martensite, and a non-metallic inclusion 20 present in the matrix 13. The matrix 13 in the present embodiment is made up of tempered martensite of the above-described component composition, which is capable of securing the necessary strength for the spring. In the present embodiment, the non-metallic inclusion 20 is, for example, an oxide such as alumina. In the present embodiment, $H_1$, which is $\sqrt{area}$ of the non-metallic inclusion 20, is $(L_1 \times L_2)^{1/2}$. It should be noted that $L_1$ and $L_2$ are a major diameter and a minor diameter, respectively, of an ellipse that is smallest in area among the ellipses circumscribing the non-metallic inclusion 20.

Figure 3:
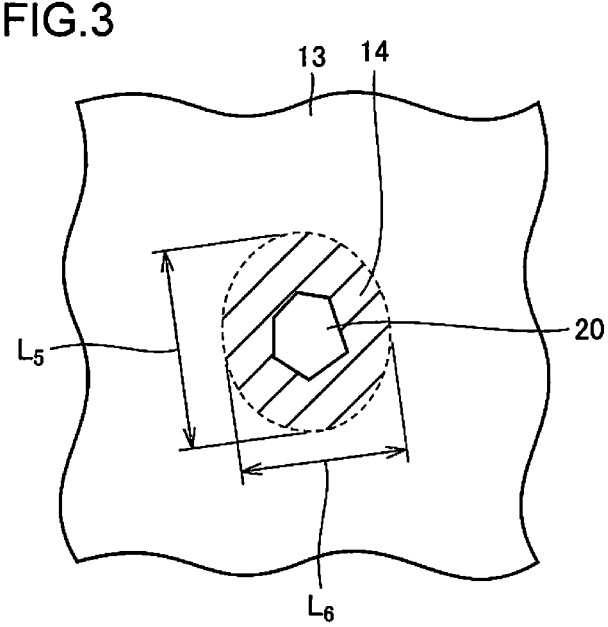
FIG. 3 is a schematic cross-sectional view showing the structure in a cross section of the steel constituting the steel wire.

FIG. 3 is a schematic cross-sectional view showing a cross section of the steel wire 1 perpendicular to the longitudinal direction. Referring to FIG. 3, a decreased-hardness portion 14 may be formed in the matrix 13, which is a region formed around the non-metallic inclusion 20 and having a hardness by the nano-indentation method of 70% or less as compared with the other region in the matrix 13. In the present embodiment, $H_2$, which is $\sqrt{area}$ of the region including both the non-metallic inclusion 20 and the decreased-hardness portion 14, is $(L_5 \times L_6)^{1/2}$. $H_2/H_1$ is at least 1 and less than 1.3. It should be noted that $L_5$ and $L_6$ are a major diameter and a minor diameter, respectively, of an ellipse that is smallest in area among the ellipses circumscribing the region including both the non-metallic inclusion 20 and the decreased-hardness portion 14.

The above-described $H_1$ and $H_2$ are calculated, for example, as follows. Firstly, a sample is taken from the steel wire 1. Then, a cross section of the obtained sample perpendicular to the longitudinal direction is polished. An optical microscope or the like is used to observe the polished surface for the presence or absence of non-metallic inclusion 20. When there exists a non-metallic inclusion 20, $H_1$ as $\sqrt{area}$ of the non-metallic inclusion 20 is calculated.

Figure 4:
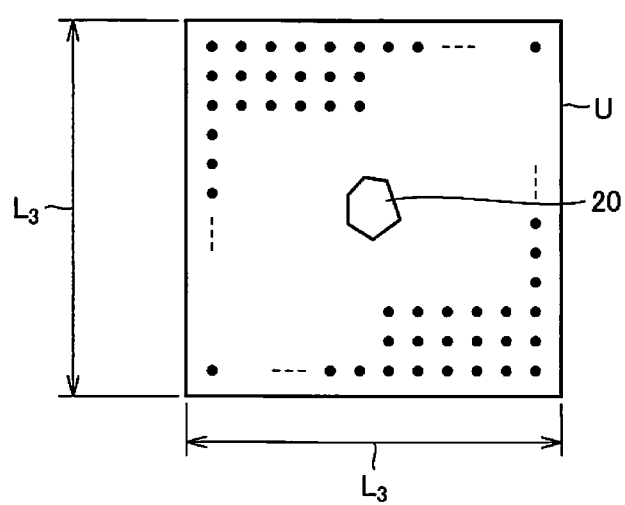
FIG. 4 is a schematic diagram showing an exemplary method of measuring a hardness using the nano-indentation method.

Referring to FIG. 4, when the non-metallic inclusion 20 is present, the hardness by the nano-indentation method is measured in a range U of a square shape having a side of $L_3$ in length so as to include the non-metallic inclusion 20 therein. Here, the hardness by the nano-indentation method refers to a pressure when a Berkovich indenter is pressed to achieve a maximum depth of indentation of 100 nm. Measurement of the hardness by the nano-indentation method in the range U is performed, for example, at 484 points positioned at equal intervals in the form of a matrix. For the measurement of the hardness by the nano-indentation method, "TriboIndenter TI980" manufactured by Bruker Nano Inc., for example, is used. As a measurement condition, a maximum load of 1 mN can be adopted.

Figure 5:
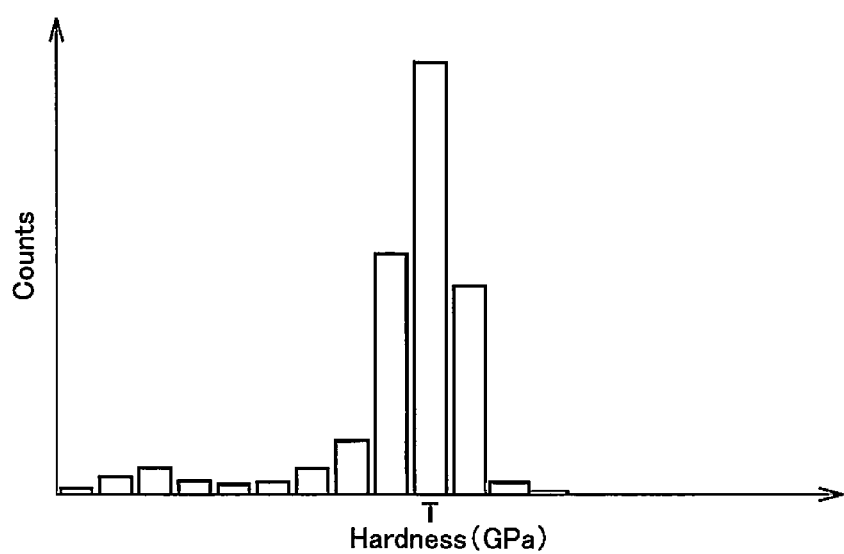
FIG. 5 is a histogram illustrating hardness distribution in a matrix.

FIG. 5 is a schematic diagram showing an example of a histogram of hardness by the nano-indentation method in the matrix 13. The horizontal axis represents hardness by the nano-indentation method, and the vertical axis represents frequency of the hardness. FIG. 5 shows only the results of the hardness by the nano-indentation method for the matrix 13, excluding the results for the non-metallic inclusion 20. Referring to FIGS. 3 to 5, in the histogram drawn in 10 GPa increments, for example, a hardness T of the highest frequency is regarded as the hardness of the matrix 13, and any point having the hardness of 70% or less of the hardness T is extracted. In the case where there is more than one hardness of the highest frequency, their average is regarded as the hardness of the matrix 13. Then, the results in the histogram of the hardness by the nano-indentation method in the matrix 13 are mapped to the range U, to thereby determine a decreased-hardness portion 14, which is the region where the hardness by the nano-indentation method is 70% or less as compared with the other region in the matrix 13. On the basis of the decreased-hardness portion 14 determined in this manner, $H_2$ this calculated, which is $\sqrt{area}$ of the region including both the non-metallic inclusion 20 and the decreased-hardness portion 14. For example, $H_2$ is calculated on the basis of decreased-hardness portions 14 corresponding respectively to ten non-metallic inclusions 20 observed according to the above. Then, $H_2/H_1$ is calculated for each of the non-metallic inclusions 20, and an average thereof is obtained.

Here, the steel wire 1 has a tensile strength, $\sigma_b$, of 2000 MPa or more. $\sigma_b$ of the steel wire 1 is preferably 2100 MPa or more. $\sigma_b$ is measured on the basis of JIS Z 2241, for example.

$\sigma_b$ of the steel wire 1 in the case where heat treatment corresponding to nitriding treatment has been performed is preferably 2000 MPa or more. It should be noted that as the heat treatment corresponding to the nitriding treatment, for example, heat treatment of heating a sample in the air at a temperature of 430° C. for 3.5 hours is performed. Next, a steel shot of 0.3 mm is used to perform shot peening. The processing time for shot peening is 30 minutes. Next, strain relieving heat treatment of heating at a temperature of 230° C. for 30 minutes is performed.

The steel constituting the steel wire 1 in the present embodiment has the prior austenite grains with the grain size number of 11 or more. The grain size number of prior austenite grains is measured on the basis of JIS G 0551. Such a small grain size of the prior austenite grains in the steel as above can improve the toughness of the steel wire 1.

Figure 6:
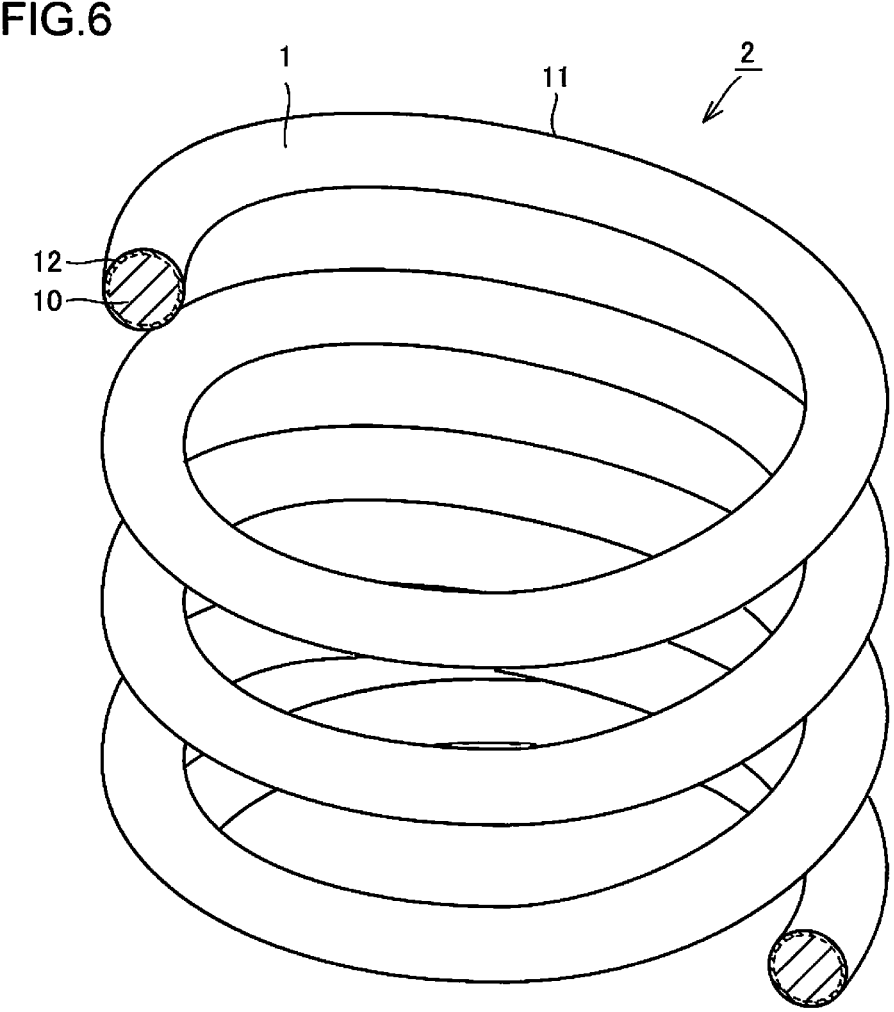
FIG. 6 is a perspective view showing the structure of a spring.

FIG. 6 is a perspective view showing the structure of a spring. FIG. 6 also illustrates a cross section of the steel wire 1 perpendicular to the longitudinal direction thereof. Referring to FIG. 6, a spring 2 in the present embodiment includes the steel wire 1. In the present embodiment, the steel wire 1 constituting the spring 2 includes a nitride layer 12 which constitutes an outer peripheral surface 11 of the steel wire 1. The nitride layer 12 thus included improves the strength of the spring 2.

Figure 7:
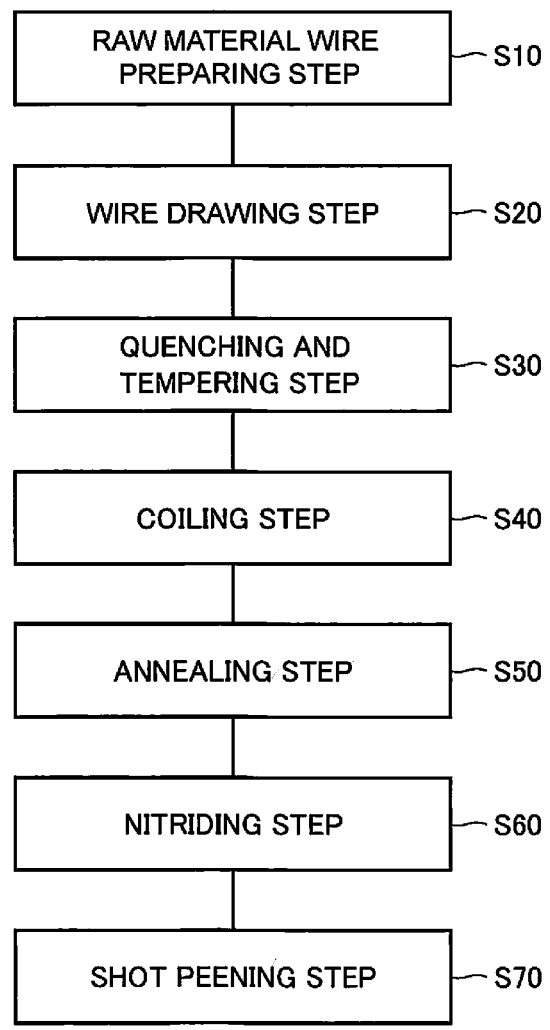
FIG. 7 is a flowchart schematically illustrating a method of producing a steel wire and a spring in a first embodiment.
Figure 8:
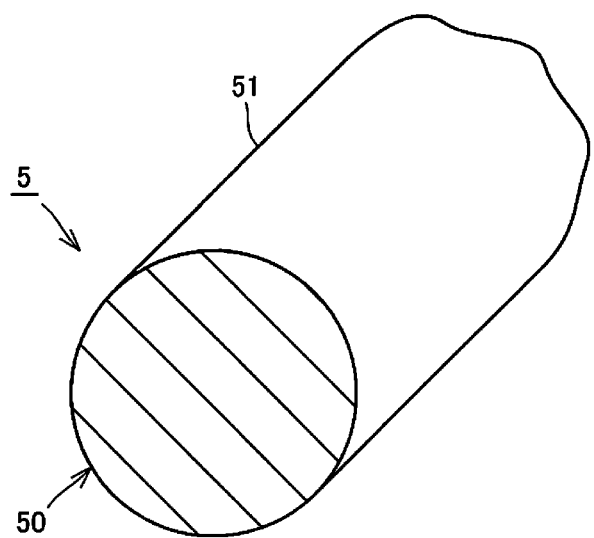
FIG. 8 is a perspective view showing the structure of a raw material wire.

An exemplary method of producing a steel wire 1 and a spring 2 will now be described. Referring to FIG. 7, in the method of producing the steel wire 1 in the present embodiment, a raw material wire preparing step S10 is performed first. FIG. 8 is a perspective view showing the structure of a raw material wire. FIG. 8 also illustrates a cross section of the raw material wire perpendicular to the longitudinal direction. In S10, referring to FIG. 8, a raw material wire 5 is prepared which contains: not less than 0.6 mass % and not more than 0.7 mass % carbon, not less than 1.2 mass % and not more than 2.1 mass % silicon, not less than 0.2 mass % and not more than 0.6 mass % manganese, not less than 1.4 mass % and not more than 2 mass % chromium, and not less than 0.15 mass % and not more than 0.3 mass % vanadium, with the balance being iron and unavoidable impurities. Specifically, a steel material is subjected to rolling, patenting, and other processing, so that the raw material wire 5 is prepared. The raw material wire 5 is a wire material made up of steel, having a cross section 50 of a circular shape perpendicular to the longitudinal direction and an outer peripheral surface 51 of a cylindrical shape.

Next, a wire drawing step S20 is performed. In S20, the raw material wire 5 is subjected to wire drawing as a drawing process. Specifically, the raw material wire 5 prepared in S10 is processed. In S20, the raw material wire 5 is drawn to a diameter of not less than 1 mm and not more than 6 mm, for example. In the present embodiment, the reduction of area as the degree of drawing is 70% or less, for example, and it is preferably 68% or less, and more preferably 66% or less. Setting the reduction of area to 70% or less can suppress occurrence of a decreased-hardness portion 14 in the vicinity of the non-metallic inclusion 20 in the matrix 13. Further, the lower limit for the reduction of area is preferably 40%, and more preferably 50%. Setting the reduction of area to 40% or more allows a fibrous structure to be formed at the time of wire drawing, ensuring high toughness after the wire drawing.

Figure 9:
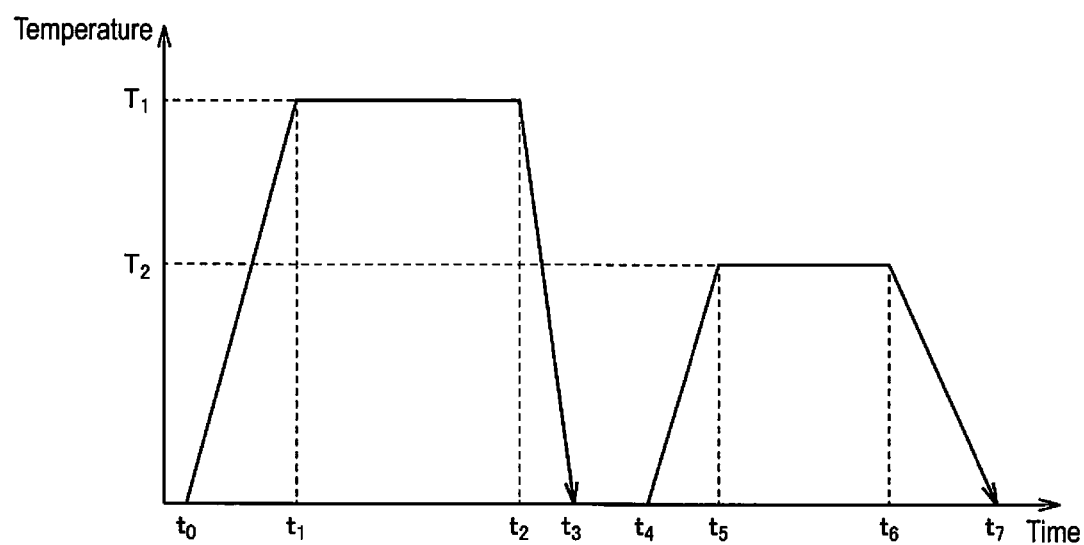
FIG. 9 is a diagram illustrating a quenching and tempering step.

Next, a quenching and tempering step S30 is performed. In this S30, the raw material wire 5 drawn in S20 is subjected to quenching and tempering processing. Referring to FIG. 9, heating of the raw material wire 5 is started at time $t_0$, and the raw material wire 5 reaches a temperature $T_1$ at time $t_1$. Thereafter, the raw material wire 5 is maintained at the quenching temperature $T_1$ until time $t_2$. The quenching temperature $T_1$ is a temperature not lower than the $A_1$ transformation point, which is the austenite transformation temperature. The quenching temperature $T_1$ is, for example, not lower than 900° C. and not higher than 1050° C. The holding time at the quenching temperature $T_1$ is, for example, not shorter than 0.3 seconds and not longer than 10 seconds. The raw material wire 5 is rapidly cooled during a period from time $t_2$ to time $t_3$. Specifically, the raw material wire 5 is cooled from the temperature not lower than the $A_1$ transformation point to a temperature not higher than the $M_s$ point. For the cooling, for example, the raw material wire 5 can be immersed in quenching oil. The cooling rate is, for example, not lower than 100° C./s and not higher than 130° C./s. This allows the steel constituting the raw material wire 5 to have a martensite structure. The quenching processing is completed through the above procedure. It should be noted that shortening the holding time at the quenching temperature $T_1$ as described above can reduce the prior austenite grain size in the steel wire 1. Further, setting the cooling rate in the above-described range can control the size of the decreased-hardness portion 14 formed in the vicinity of the non-metallic inclusion 20 in the matrix 13.

Next, heating of the raw material wire 5 is started at time $t_4$, and the raw material wire 5 reaches a tempering temperature $T_2$ at time $t_5$. Thereafter, the raw material wire 5 is maintained at the tempering temperature $T_2$ until time $t_6$. The tempering temperature $T_2$ is a temperature lower than the $A_1$ transformation point. The tempering temperature $T_2$ is, for example, not lower than 450° C. and not higher than 600° C. Thereafter, the raw material wire 5 is cooled during a period from time $t_6$ to time $t_7$. The cooling can be performed by air cooling, for example. This allows the steel constituting the raw material wire 5 to have a tempered martensite structure. The tempering processing is completed through the above procedure, and the steel wire 1 of the present embodiment is obtained.

A method of producing a spring 2 using the steel wire 1 obtained in S30 will now be described. Continuously from S30, a coiling step S40 is performed, where the steel wire is coiled into a spring shape. In this S40, referring to FIGS. 1 and 6, the steel wire 1 is plastically worked into a helical shape, as shown for example in FIG. 6, and thus formed into the shape of a spring.

Next, an annealing step S50 is performed. In this S50, the steel wire 1 formed into the spring shape in S40 is subjected to annealing processing. Specifically, the steel wire 1 formed into the spring shape is heated, so that the strain in the steel wire 1 caused in S40 is reduced.

Next, a nitriding treatment step S60 is performed. In this S60, the steel wire 1 having undergone annealing processing in S50 is subjected to nitriding treatment. Although S60 is not an indispensable step in the method of producing the spring of the present embodiment, when the step is performed, a nitride layer 12 is formed to include the outer peripheral surface 11 of the steel wire 1. As a result, the spring 2 can be improved in strength. Next, a shot peening step S70 is performed. In this S70, the steel wire 1 having undergone nitriding treatment in S60 is subjected to shot peening. Although S70 is not an indispensable step in the method of producing the spring of the present embodiment, when the step is performed, compressive stress is applied to the region including the surface of the spring 2, which contributes to improved fatigue strength. The spring 2 of the present embodiment is completed through the above steps.

Here, in the steel wire 1 in the present embodiment, the above-described component composition is adopted, so that the steel wire 1 having high strength is obtained. Further, in the steel wire 1 in the present embodiment, costly nickel is not adopted as an additive element. This can suppress the increase in cost. The fatigue strength of the spring 2 can be improved by decreasing the susceptibility to inclusions in a region of the steel wire 1 constituting the spring 2 where the distance from the outer peripheral surface 11 of the steel wire 1 is, for example, not smaller than 100 μm and not greater than 300 μm. The susceptibility to inclusions can be sufficiently suppressed by setting $H_2/H_1$ in the steel wire 1 to be less than 1.3. In the steel wire 1, the susceptibility to inclusions is suppressed over the entire region including the above-described region. Accordingly, the spring 2 in the present embodiment, which includes the above-described steel wire 1, can achieve improved fatigue strength while suppressing the increase in cost.

EXAMPLES

Samples of the above-described steel wire 1 of the present disclosure were produced and subjected to evaluation to confirm the effect of improving fatigue strength. The evaluation procedure was as follows.

A sample 1 was produced in a similar procedure as the method of producing the steel wire 1 explained in the above embodiment. The sample 1 has a component composition corresponding to a steel type A shown in Table 1. The cooling rate at quenching was 123° C./s, and the reduction of area was 66%. For comparison, a sample 2 was produced in a similar manner as the sample 1 except that the cooling rate at quenching was 500° C./s. Further, a sample 3 was produced in a similar manner as the sample 1 except that it had a steel type B shown in Table 1. A sample 4 was produced in a similar manner as the sample 1 except that it had a steel type C shown in Table 1.

TABLE 1

| | C (mass %) | Si (mass %) | Mn (mass %) | Cr (mass %) | V (mass %) |
|---|---|---|---|---|---|
| Steel Type A | 0.65 | 1.9 | 0.37 | 1.77 | 0.19 |
| Steel Type B | 0.72 | 2.29 | 0.71 | 2.21 | 0.33 |
| Steel Type C | 0.5 | 1.8 | 0.7 | 1.2 | 0.15 |

For the steel wires of the samples 1 and 2, $H_2/H_1$ was calculated. For the steel wires of the samples 1 to 4, $\sigma_b$ was measured. For the steel wires of the samples 1 to 4, the grain size of the prior austenite grains was measured.

The samples 1 to 4 produced in the above-described manner were subjected to heat treatment corresponding to nitriding treatment. $\sigma_b$ after the heat treatment corresponding to nitriding treatment was measured. Further, the samples 1 to 4 having undergone the heat treatment corresponding to nitriding treatment were subjected to a rotating bending fatigue test (fatigue test) to measure the fatigue strength. The cutoff for the test was set to be $10^7$ times. The rotating bending fatigue test was performed using the Nakamura-type rotating bending fatigue testing machine Type 3 manufactured by Shimadzu Corporation. To determine the S-N curve, 10 or more samples were used to perform the fatigue test, and additional 10 or more samples were used to perform a staircase test. The staircase test was started at the stress corresponding to the fatigue strength of the sample, and when the sample did not break, the stress was increased by 10 MPa, whereas when the sample broke, the stress was reduced by 10 MPa. By adjusting the load stress by the rotating bending fatigue testing machine in this manner, the rotating bending fatigue test was conducted to obtain 20 or more broken samples. For each of the 20 or more broken samples, the fracture surface in the region of radially not less than 100 μm and not more than 300 μm from the outer peripheral surface of the sample was observed to confirm the presence or absence of a non-metallic inclusion at the origin of the fracture. When there was a non-metallic inclusion at the origin of the fracture, the sample was determined to be one that was fractured due to the non-metallic inclusion. A total number of samples fractured due to the non-metallic inclusions was divided by the total number of the broken samples to calculate the susceptibility to inclusions (%). The test results are shown in Table 2.

TABLE 2

| | Steel Type | Cooling Rate (° C./sec) | $H_2/H_1$ | $\sigma_b$ (MPa) | Grain Size Number | $\sigma_b$ after Heat Treatment Corresponding to Nitriding Treatment (MPa) | Susceptibility to Inclusions (%) | Fatigue Strength (MPa) |
|---|---|---|---|---|---|---|---|---|
| Sample 1 | Steel Type A | 123 | 1 | 2158 | 12.1 | 2071 | 0 | 1090 |
| Sample 2 | Steel Type A | 500 | 1.75 | 2141 | 12.2 | 2082 | 44 | 1060 |
| Sample 3 | Steel Type B | 123 | — | 2146 | 12.1 | 2080 | 50 | 1080 |
| Sample 4 | Steel Type C | 123 | — | 2119 | 12.1 | 1855 | 8 | 1020 |

As understood from the evaluation results in Table 2, the sample 1 of the steel type A has improved strength and clearly decreased susceptibility to inclusions as compared with the samples 3 and 4 of the steel types B and C. Further, even if heat treatment corresponding to nitriding treatment is performed, the decrease in strength is suppressed in the sample 1 as compared with that in the sample 4. In the sample 1 with the low cooling rate, the strength is improved and susceptibility to inclusions is clearly decreased as compared with the sample 2 with the high cooling rate. As a result, the sample 1 has improved fatigue strength. As such, the steel wire according to the present disclosure has its strength improved and its susceptibility to inclusions suppressed, and thus, it achieves improved fatigue strength of the spring.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: steel wire; 2: spring; 5: raw material wire; 10, 50: cross section; 11, 51: outer peripheral surface; 12: nitride layer; 13: matrix; 14: decreased-hardness portion; 20: non-metallic inclusion; A, B, C: steel type; T: hardness; $T_1$, $T_2$: temperature; U: range; a: major diameter; b: minor diameter; and $t_0$, $t_1$, $t_2$, $t_3$, $t_4$, $t_5$, $t_6$, $t_7$: time.

The invention claimed is:

1. A steel wire formed of a steel containing:
   not less than 0.6 mass % and not more than 0.7 mass % carbon, not less than 1.2 mass % and not more than 2.1 mass % silicon,
not less than 0.2 mass % and not more than 0.6 mass % manganese,
not less than 1.4 mass % and not more than 2 mass % chromium, and
not less than 0.15 mass % and not more than 0.3 mass % vanadium,
with the balance being iron and unavoidable impurities,
the steel wire having
   a wire diameter of not less than 1 mm and not more than 6 mm, and
   a tensile strength of 2000 MPa or more,
the steel including
   a matrix made up of tempered martensite, and
   a non-metallic inclusion present in the matrix,
   wherein the non-metallic inclusion is an oxide;
wherein when √area of the non-metallic inclusion is represented as $H_1$ and √area of a region including both the non-metallic inclusion and a decreased-hardness portion, which is a region formed around the non-metallic inclusion in the matrix and having a hardness by a nano-indentation method of 70% or less as compared with the other region of the matrix, is represented as $H_2$, a ratio of $H_2$ to $H_1$, or, $H_2/H_1$ is at least 1 and less than 1.3.

2. The steel wire according to claim 1, wherein the steel has prior austenite grains with the grain size number of 11 or greater.

3. A spring comprising the steel wire according to claim 2.

4. A spring comprising the steel wire according to claim 1.

5. The spring according to claim 4, wherein the steel wire includes a nitride layer constituting an outer peripheral surface of the steel wire.

6. The spring according to claim 5, wherein the steel wire includes a nitride layer constituting an outer peripheral surface of the steel wire.

7. The steel wire according to claim 1, wherein the decreased-hardness portion has a tempered martensite structure.

\* \* \* \* \*